(12) United States Patent
Shearer (10) Patent No.: US 7,104,462 B2
(45) Date of Patent: Sep. 12, 2006

(54) LOW NOISE SOLID-STATE THERMOSTAT WITH MICROPROCESSOR CONTROLLED FAULT DETECTION AND REPORTING, AND PROGRAMMABLE SET POINTS

(75) Inventor: Jon Douglas Shearer, Hartville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/754,152

(22) Filed: Jan. 9, 2004

(65) Prior Publication Data

US 2005/0150968 A1    Jul. 14, 2005

(51) Int. Cl.
  *G05D 23/00*  (2006.01)
  *F25B 49/00*  (2006.01)
  *G01K 13/00*  (2006.01)

(52) U.S. Cl. ............................ 236/94; 62/126; 62/127; 62/129; 165/11.1

(58) Field of Classification Search ............ 236/46 A, 236/46 C, 46 D, 78 R, 78 A, 78 D, 94; 62/126, 62/127, 129, 130; 165/11.1, 200, 201, 287
See application file for complete search history.

(56) References Cited

U.S. PATENT DOCUMENTS

| | | | |
|---|---|---|---|
| 3,456,455 A | | 7/1969 | Sapir |
| 4,282,423 A | * | 8/1981 | Volz ............................ 219/490 |
| 4,365,167 A | | 12/1982 | Weimer et al. |
| 4,776,514 A | | 10/1988 | Johnstone et al. |
| 5,063,836 A | * | 11/1991 | Patel ............................ 99/281 |
| 5,351,162 A | | 9/1994 | Koishikawa |
| 5,592,989 A | | 1/1997 | Lynn et al. |
| 5,765,994 A | | 6/1998 | Barbier |
| 5,866,880 A | | 2/1999 | Seitz et al. |
| 5,924,486 A | | 7/1999 | Ethlers et al. |
| 6,006,996 A | | 12/1999 | Bhatnagar |
| 6,049,658 A | | 4/2000 | Schave et al. |
| 6,134,134 A | | 10/2000 | Dushane et al. |
| 6,336,593 B1 | * | 1/2002 | Bhatnagar .................. 236/78 R |
| 6,396,032 B1 | | 5/2002 | Denny et al. |
| 6,691,923 B1 | | 2/2004 | Shearer |

FOREIGN PATENT DOCUMENTS

| | | |
|---|---|---|
| GB | 2 256 940 A | 12/1992 |
| WO | 97/46928 | 12/1997 |

OTHER PUBLICATIONS

European Search Report for corresponding Application No. 04031072.4 dated Feb. 16, 2006.

* cited by examiner

*Primary Examiner*—Marc Norman
(74) *Attorney, Agent, or Firm*—Renner, Otto, Boisselle & Sklar, LLP (57) ABSTRACT

A low noise solid state thermostat is provided which includes a thermostat input operatively configured to be coupled to a temperature sensor; a comparator for comparing an output of the temperature sensor to a predefined setpoint temperature; and solid-state switching circuitry operatively coupled to the comparator for selectively switching current to a thermostat output based on the comparison by the comparator, wherein the comparator comprises a microprocessor for comparing the output of the temperature sensor to the predefined setpoint temperature, the predefined setpoint temperature being programmed into a memory accessible by the microprocessor.

21 Claims, 6 Drawing Sheets

LOW NOISE SOLID-STATE THERMOSTAT WITH MICROPROCESSOR CONTROLLED FAULT DETECTION AND REPORTING, AND PROGRAMMABLE SET POINTS

TECHNICAL FIELD

The present invention deals with thermostats, and more particularly to solid state thermostats with low EMI/EMC noise operation.

BACKGROUND OF THE INVENTION

Mechanical thermostats are oftentimes used to control temperature in various different control environments. There are, however, various drawbacks associated with such conventional type thermostats. For example, mechanical thermostats tend to produce noise in the form of electromagnetic interference (EMI). This can be significant in environments in which noise level is critical. Furthermore, cycling on/off of such thermostats results in wear which can eventually lead to reliability problems.

Electronic thermostats have been developed which may alleviate some of the disadvantages associated with conventional mechanical thermostats. However, there remains a strong need in the art for a solid-state thermostat which provides low noise operation and high reliability. More particularly, there is a strong need in the art for such a thermostat which is capable of fault detection and reporting. In addition, there is a strong need in the art for such a thermostat which is programmable with respect to setpoints, etc.

SUMMARY OF THE INVENTION

According to one aspect of the invention, a low noise solid state thermostat is provided which includes a thermostat input operatively configured to be coupled to a temperature sensor; a comparator for comparing an output of the temperature sensor to a predefined setpoint temperature; and solid-state switching circuitry operatively coupled to the comparator for selectively switching current to a thermostat output based on the comparison by the comparator, wherein the comparator comprises a microprocessor for comparing the output of the temperature sensor to the predefined setpoint temperature, the predefined setpoint temperature being programmed into a memory accessible by the microprocessor.

According to another aspect of the invention, a low noise solid state thermostat is provided which includes a thermostat input operatively configured to be coupled to a temperature sensor; a comparator for comparing an output of the temperature sensor to a predefined setpoint temperature; solid-state switching circuitry operatively coupled to the comparator for selectively switching current to a thermostat output based on the comparison by the comparator; and a microprocessor configured to monitor operation of the thermostat and to detect a fault in the operation.

In accordance with yet another aspect of the invention, a method is provided for coupling a heat generating device to a heat sink. The method includes the steps of applying one side of a layer of thermally conductive double-sided tape to one of the heat generating device and the heat sink; and applying an other side of the layer of thermally conductive double-sided tape to the other of the heat generating device and the heat sink.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
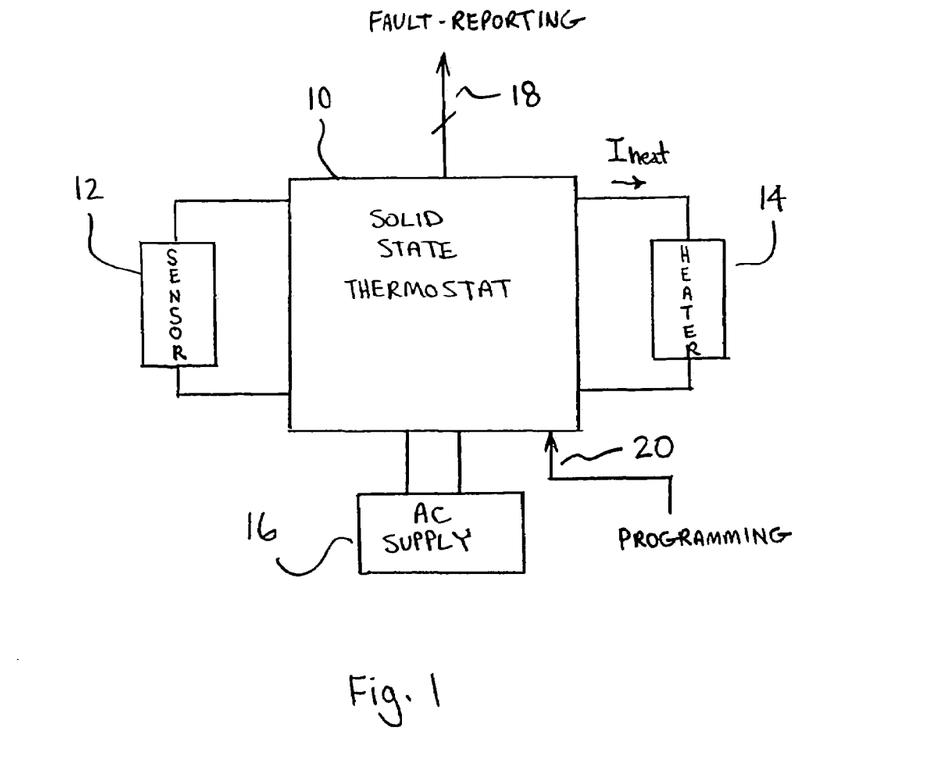
FIG. 1 is a block diagram of a system including a heater element, sensor and solid-state thermostat in accordance with the present invention.

Referring to FIG. 1, a low noise solid-state thermostat 10 is provided in accordance with the present invention. The thermostat 10 replaces conventional mechanical and electronic thermostats which are used to control temperatures and regulate power. For example, the thermostat 10 may be used to control temperature and regulate power in heated hoses, floor panels, drain masts and water heaters in an aircraft. It will be appreciated, however, that the thermostat 10 has utility with a variety of different control systems and is not necessarily limited to aircraft applications.

A temperature sensor 12 is coupled to an input of the thermostat 10. In the exemplary embodiment, the temperature sensor 12 is a resistive element (e.g., thermistor or the like) having an impedance which varies as a function of temperature. It will be appreciated, however, that a variety of other types of temperature sensors 12 may also be used without departing from the scope of the invention.

The output of the thermostat 10 is coupled to a heater element 14. In the exemplary embodiment, the heater element 14 is a resistive element through which the thermostat 10 provides a controlled heater current $I_{heat}$. Again, however, it will be appreciated that a variety of other types of heater elements 14 may be used without departing from the scope of the invention. Moreover, the heater element 14 may instead be replaced by a cooling element, for example, in the case where controlled cooling is desired. An AC power supply 16 is included which supplies an AC operating voltage to the thermostat 10.

The thermostat 10 can be used in any of a variety of applications where temperature control via a heating (or cooling) element 14 is desired. As will be appreciated based on the following description, the thermostat 10 senses the actual temperature of a temperature regulated device or environment via the output of the sensor 12. Based on whether the actual temperature is above or below a predefined setpoint, for example, the thermostat 10 selectively provides current $I_{heat}$ to turn on/off the heater element 14. Additionally, it is possible to provide a predefined amount of hysteresis. In some cases, the sensor 12 may be located separate from the heater element 14. In other cases, the sensor 12 may be located proximate or even directly on the heater element 14 as will be appreciated.

The thermostat 10 is capable of operating using 115 volt AC single phase power from the power supply 16, and such AC power may be over a wide range of frequencies (e.g., from 0 Hertz (Hz) to 2000 Hz). As will be better appreciated based on the following description, the thermostat 10 incorporates a soft start turn ON/OFF feature which reduces electromagnetic emissions (e.g., EMI). In addition, the thermostat 10 is designed to provide common mode noise cancellation. Moreover, the thermostat 10 uses state of the art complementary metal-oxide-semiconductor (CMOS) and metal-oxide-semiconductor field effect transistor (MOSFET) technology which improves reliability over conventional mechanical relays and thermostats. The overall package may be on the order of 1.4 inch×0.8 inch×0.6 inch and can control 300 watts of power with 97% efficiency. Custom temperature setpoints can be selected at the time of production and/or subsequent to production.

The thermostat 10 further provides fault-reporting as an output 18. As will be described in more detail below in connection with FIG. 2, the thermostat 10 is configured to perform self-diagnostics. In the event the thermostat 10 detects a fault, the thermostat 10 may report such fault to an external device such as the main system control (not shown) via the output 18. Based on the type of fault, the thermostat 10 is configured to take appropriate action. Fault detection may include, for example, a shorted heating element, open or shorted solid state switches, open or shorted temperature sensor, or overrange temperature within the thermostat 10.

The thermostat 10 also includes a programming interface input 20. As will also be described in more detail below, the temperature setpoints can be programmed in the thermostat 10 via the input 20. Thus, not only can custom temperature setpoints be programmed at the time of production and/or subsequent to production, but the setpoints also may be subsequently changed via a simple reprogramming step.

Figure 2:
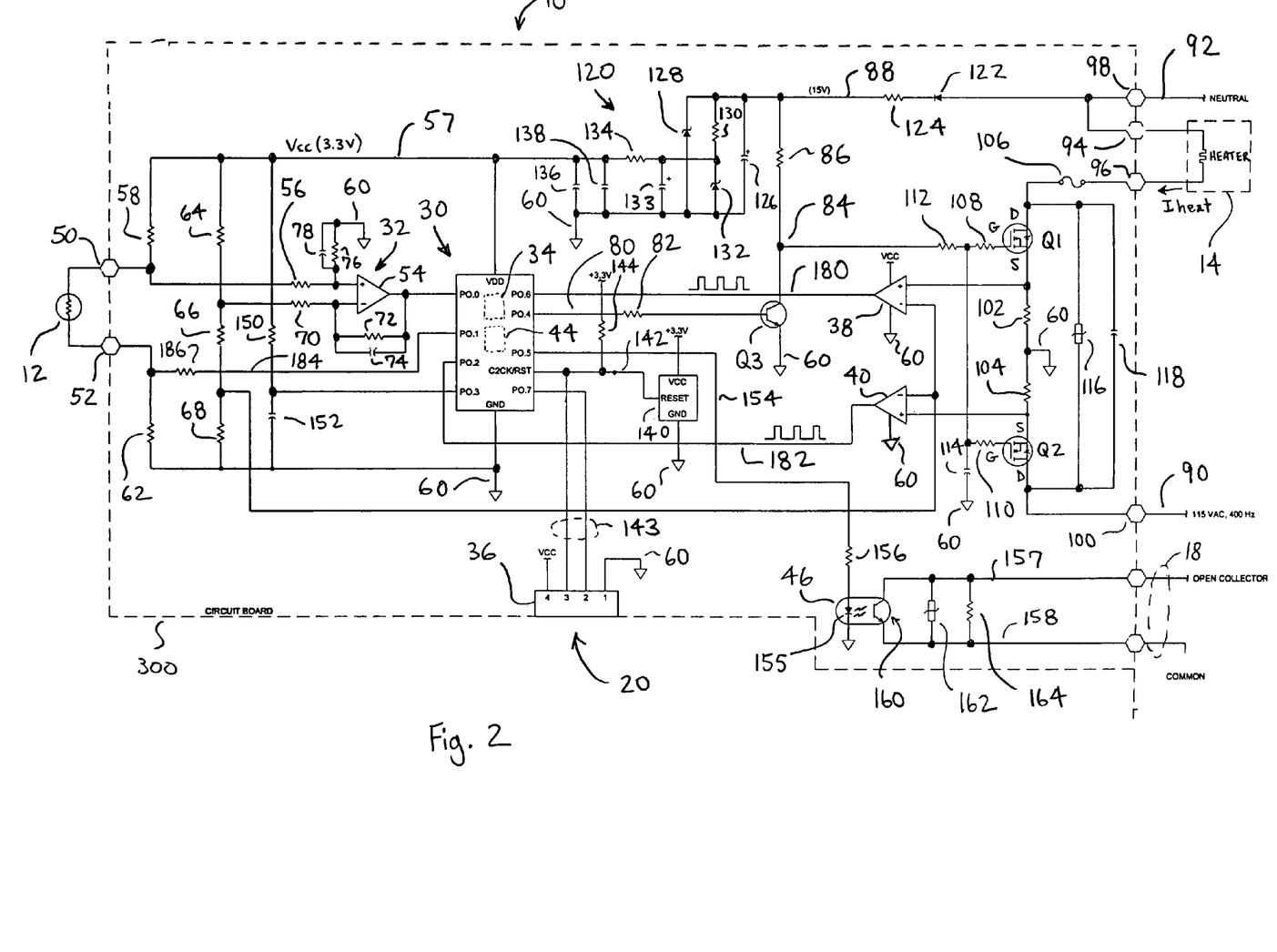
FIG. 2 is a schematic diagram of an exemplary embodiment of the solid-state thermostat in accordance with the present invention.

Referring now to FIG. 2, the thermostat 10 is illustrated in detail. The thermostat 10 is built around a microprocessor 30 that provides the programming and fault detection capabilities discussed in detail below in relation to FIGS. 3–7. Generally speaking, the output of the temperature sensor 12 is input to the microprocessor 30 via a filter and gain circuit 32. The microprocessor 30 compares the output of the temperature sensor 12 to one or more predetermined setpoint temperatures. Based on such comparison, the microprocessor 30 turns power switching transistors Q1 and Q2 on or off in order to selectively provide the heater current $I_{heat}$ to the heater element 14.

In the exemplary embodiment, the microprocessor 30 includes an internal flash memory 34 in which the one or more setpoint temperatures are programmed. The thermostat 10 includes a connector 36 to which a personal computer or other programming device can be connected in order to program the microprocessor 30. As is described in more detail below, the personal computer or other programming device provides setpoint temperature(s) to the microprocessor 30 which are stored in the memory 34. Thus, the setpoint temperature(s) can be programmed into the thermostat at the time of manufacture or subsequently. Moreover, the setpoint temperature(s) may be subsequently reprogrammed as needed. (See discussion of FIG. 3 below).

As mentioned above, the microprocessor 30 also provides fault detection capabilities. More specifically, the thermostat 10 further includes rail-to-rail comparators 38 and 40. The comparators 38 and 40 monitor the current provided through the switching transistors Q1 and Q2, respectively. Depending on whether current flows through the transistors, the comparators 38 and 40 output a string of pulses to the microprocessor 30 as will be discussed in more detail below. Based on the presence or absence of such pulses, the microprocessor 30 detects one or more types of faults relating to the heater element 14 and switching transistors Q1 and Q2. (See discussion of FIG. 6 below).

The microprocessor 30 also monitors the status of the temperature sensor 12. In the exemplary embodiment, the microprocessor 30 measures the voltage across the temperature sensor. In the event of an unusually high or low voltage, the microprocessor 30 is able to detect a fault in the temperature sensor 12. (See discussion of FIG. 5 below). Furthermore, the microprocessor 30 includes an internal temperature sensor 44 which serves to sense the temperature of the thermostat 10 itself. Should the temperature measured by the internal temperature sensor 44 exceed a predetermined value, for example, the microprocessor 30 detects a fault.

The exemplary embodiment of the microprocessor 30 includes an opto-coupler 46 connected to an output of the microprocessor 30. In the event the microprocessor 30 detects a fault in the heater element 14, switching transistors, etc., the microprocessor 30 can be programmed to report such fault to an external device via the opto-coupler 46. Moreover, the microprocessor 30 may be programmed to take desired action in response to such fault. For example, the microprocessor 30 may cease current to the heater element 14 for a predetermined time, allow the current to continue to flow for a predetermined time, power down the thermostat 10, etc.

According to the example described herein, the microprocessor 30 is a commercially available C8051F302 microcontroller from Cygnal, Inc. Such microcontroller is an 8-bit, 8K controller with a built in flash memory and temperature sensor. The various ports may be configured as analog/digital inputs and outputs. However, it will be appreciated that a wide variety of other microprocessors may be utilized without departing from the scope of the invention. Moreover, although the present invention as described herein makes use of the internal memory 34 and temperature sensor 44 built in the microprocessor 30, another embodiment may utilize a memory or temperature sensor external to the microprocessor 30 without departing from the scope of the invention.

Continuing to refer to FIG. 2, the thermostat 10 includes a pair of input terminals 50 and 52. The resistive-type temperature sensor 12 is connected via a corresponding pair of leads to the input terminals 50 and 52 as shown in FIG. 2. The input terminal 50 is coupled to the non-inverting input of a differential amplifier 54 via a resistor 56 included in the filter and gain circuit 32. In addition, the input terminal 50 is coupled to the Vcc rail (3.3V) 57 through a resistor 58. The input terminal 52 is coupled to a circuit common (or floating ground) 60 through a resistor 62.

Accordingly, the resistor 58, temperature sensor 12 and resistor 62 present a voltage divider between the $V_{cc}$ rail 57 and the circuit common 60. As the resistance of the temperature sensor 12 changes as a function of temperature, the voltage across the temperature sensor 12 varies. Furthermore, a voltage divider is made up of resistors 64, 66 and 68 connected in series between the Vcc rail 57 and the circuit common 60 as shown in FIG. 2. The voltage at the node between resistors 64 and 66 serves as a reference voltage and is input to the inverting input of the differential amplifier 54 via a resistor 70. Thus, the differential amplifier 54 compares the voltage across the temperature sensor 12 as measured at the input terminal 50 to the reference voltage at the at the node between resistors 64 and 66. The output of the differential amplifier 54 is input to an A/D input of the microprocessor 30, and therefore represents the temperature as measured by the temperature sensor 12.

Those having ordinary skill in the art will recognize that the values of resistors 58, 62, 64, 66 and 68 may be selected to optimize the range of the temperature sensor 12. Moreover, the filter and gain circuit 32 further includes feedback resistor 72 and capacitor 74 coupled between the output and inverting input of the differential amplifier 54. In addition, a parallel combination of resistor 76 and capacitor 78 is coupled between the non-inverting input of the differential amplifier 54 and the circuit common 60. The values of resistors 56, 70, 72 and 76, and capacitors 74 and 78 may be selected to provide the desired filtering and gain as will be appreciated by those having ordinary skill in the art.

The microprocessor 30 compares the temperature measured by the temperature sensor 12 (as represented by the output of the differential amplifier 54) with a predetermined setpoint or setpoints stored in memory 34. A single set point may be used if simple on/off operation of the heater element 14 is desired. Alternatively, two setpoints may be utilized, for example, in order to provide an element of hysteresis in the turning on/off of the heater element 14. (See, e.g., discussion below of FIG. 4).

If the measured temperature falls below the predetermined setpoint(s), the microprocessor 30 produces an active low voltage level output on line 80. If the measured temperature exceeds the predetermined setpoint(s), the microprocessor 30 outputs a high voltage level output on line 80. The output on line 80 is connected to the base of an npn bipolar transistor Q3 via a resistor 82. When the output on line 80 is a high voltage (e.g., 3.3V), the transistor Q3 is turned on and pulls the voltage at node 84 down to the circuit common 60. Node 84 is coupled to the gates of power MOSFETs Q1 and Q2, and thus turns off Q1 and Q2, resulting in no heater current $I_{heat}$ flowing through the series connected heater element 14. When the output on line 80 is an active low voltage level (e.g., circuit common), the transistor Q3 is turned off. As a result, the voltage at node 84 is pulled up by pull-up resistor 84 to a high voltage level DC power rail 88 (e.g., 15V). The gates of the transistors Q1 and Q2 are thereby turned on, and heater current $I_{heat}$ will then flow through the series connected heater element 14.

As is shown in FIG. 2, the heater element 14 and transistors Q1 and Q2 are connected in series between a hot 115 volt AC line 90 and neutral line 92 to which power from the AC power supply 16 (FIG. 1) is provided. More specifically, the thermostat 10 includes output terminals 94 and 96 to which the respective leads of the resistive heater element 14 are connected. One lead of the heater element 14 is connected to output terminal 94, and the other lead is connected to the output terminal 96.

The neutral line 92 is coupled to the output terminal 94 via a neutral line terminal 98. The hot AC line 90 is coupled to the drain D of switching transistor Q2 via an AC hot terminal 100. The source S of the switching transistor Q2 is coupled to the source S of the switching transistor Q1 through a pair of current sense resistors 102 and 104. The node between the current sense resistors 102 and 104 is tied to the circuit common 60. The circuit common 60 floats in the sense that its potential is not fixed relative to the operating voltage provided by the AC power supply 16. The drain D of the switching transistor Q1 is coupled to one end of the heater element 14 via a fuse 106 and terminal 96. When the switching transistors Q1 and Q2 are on, the heater current $I_{heat}$ flows primarily from the neutral line 92 through the heater 14, the switching transistors Q1 and Q2, and the hot AC line 90. When the switching transistors Q1 and Q2 are off, no current flows through the heater element 14. The fuse 106 provides overcurrent protection.

Resistors 108 and 110 are respectively coupled to the gates of the switching transistors Q1 and Q2, and are each connected to node 84 through a resistor 112. A capacitor 114 couples the node between the resistors 108, 110 and 112 to the circuit common 60. The resistors 108 and 110 are provided primarily for avoiding ringing during parallel switching. Capacitor 114 provides soft-start power switching. A transient voltage suppressor (TVS) 116 and capacitor 118 are connected in parallel across the drains of transistors Q1 and Q2. The TVS 116 and capacitor 118 provide electrostatic discharge (ESD) protection and noise suppression across the outputs of the transistors Q1 and Q2.

As previously mentioned, in the event the measured temperature as represented by the output of the differential amplifier 54 is less than the setpoint temperature the output of the microprocessor 30 on line 80 goes low. This, results in the gate voltage to the transistors Q1 and Q2 going high and turning the transistors on, thus causing the heater current $I_{heat}$ to flow through the heater element 14 to produce heating. Conversely, when the output of the microprocessor 30 on line 80 goes high the gate voltage to the transistors Q1 and Q2 is low thus turning the transistors off. As a result, the heater current $I_{heat}$ does not flow thru the heater element 14 and the heater element 14 is inactive.

Thus, it will be appreciated that the thermostat 10 controls whether the heater element 14 is on or off based on whether the temperature as measured by the sensor 12 is above or below the predetermined setpoint temperature. The supply voltage $V_{cc}$ on line 57 and high level DC supply voltage on line 88 is provided via a double regulation circuit 120 included in the thermostat 10. Current from the neutral line 92 passes through a blocking diode 122 and a current limiting resistor 124 onto line 88. This charges up a capacitor 126 which is coupled between line 88 and the circuit common 60. The capacitor 126 charges to a reference level defined by the breakdown voltage of the zener diode 128 (e.g., 15 volts). Thus, the capacitor 126 and zener diode 128 regulate the voltage on line 88.

A resistor 130 and another zener diode 132 are connected in series between line 88 and the circuit common 60. The zener diode 132, in the exemplary embodiment, has a breakdown voltage of 3.3V. A capacitor 133 is connected in parallel with the zener diode 132. Thus, the voltage at the node between the resistor 130 and zener diode 132 becomes regulated at 3.3V and is coupled to line 57 via a resistor 134. Filtering capacitors 136 and 138 complete the regulation circuit 120.

The thermostat 10 further includes a power supervisor 140 having an output on line 142 coupled to a clock/reset input of the microprocessor 30. Line 142 is tied to the voltage on line 57 via a pull-up resistor 144. The power supervisor 140 is connected to Vcc on line 57 and monitors the actual voltage thereon. In the event the power on line 57 was to drop below a predetermined level which could jeopardize the data in memory in the microprocessor 30, the power supervisor 140 pulls the voltage on line 142 down to the circuit common 60. The power supervisor 140 then holds the voltage on line 142 down for a predetermined time following the voltage on line 57 coming back up. In this manner, the thermostat 10 avoids loss of the microprocessor memory data.

The thermostat 10 also includes an interface for programming the microprocessor 30 via the connector 36. A two-wire interface bus 143 is provided between the connector 36 and the clock/reset port of the microprocessor 30 on line 142 and a programming input IDE port of the microprocessor 30. Using conventional programming protocol dictated by the particular microprocessor 30 used in the thermostat 10, one may program the microprocessor 30 to operate in accordance with the functions described herein. Accordingly, detail as to the specific programming code has been omitted for sake of brevity.

The clock frequency of the microprocessor 30 is established by resistor 150 and capacitor 152 connected in series between Vcc line 57 and the circuit common 60. The node between the resistor 150 and capacitor 152 is coupled to an input port of the microprocessor 30 such that the values of resistor 150 and capacitor 152 set the clock frequency of the microprocessor 30.

For the purpose of fault detection reporting as well as any other type communications, the microprocessor 30 produces a serial output on line 154. In turn, line 154 drives the light emitting diode 155 in the opto-coupler 46 through a resistor 156 so that the output on line 154 is coupled to a two-wire communication bus comprising lines 157 and 158. Line 157 represents the open collector from the opto-coupler 46, and line 158 is coupled to an output circuit common. When the light emitting diode 155 is on (e.g., a logic "1"), the transistor 160 in the opto-coupler 46 is turned on and pulls the voltage on line 157 down to the circuit common 60. When the light emitting diode 155 is not on (e.g., a logic "0"), the transistor 160 remains off and line 157 is permitted to float. A TVS 162 provides ESD protection, and a load resistor 164 is provided to establish a voltage across the lines 157 and 158.

Lines 157 and 158 thus serve as the output bus 18 (FIG. 1) for communicating with an external device. As noted above, such communications may include fault reporting or various other communications.

Further regarding fault detection, the non-inverting input of the comparator 38 is coupled to the node between the current sense resistor 102 and the source of Q1. The non-inverting input of the comparator 40 is coupled to the node between the current sense resistor 104 and the source of Q2. The inverting inputs of each of the comparators 38 and 40 is coupled to a reference voltage derived from the node between resistors 66 and 68.

During a positive cycle of the AC input voltage across lines 90 and 92, if the transistor Q1 is turned on current through the resistor 102 creates a voltage at or near the peak of the positive cycle which exceeds the reference voltage. This produces a pulse in the output of the comparator 38 with each positive cycle. Similarly, if the transistor Q2 is turned on the current through the resistor 104 creates a voltage at or near the peak of the negative cycle which exceeds the reference voltage. This produces a pulse in the output of the comparator 40 with each negative cycle.

The output of the comparator 38 is input to the microprocessor 30 via line 180. Likewise, the output of the comparator 40 is input to the microprocessor 30 via line 182. By detecting whether pulses (or a single pulse in the case of DC power operation) are present at the output of the comparators at the appropriate time, the thermostat 10 is able to detect and report faults as further explained below in relation to FIG. 6.

The voltage at the node between the input terminal 52 and the resistor 62 is also input to the microprocessor 30 on line 184 via a resistor 186. Such input is also indicative of the voltage across the temperature sensor 12. In the event the temperature sensor 12 experiences a short fault, the voltage on line 184 will rise above a predesigned value, thus indicating a fault to the microprocessor 30. Similarly, if the voltage on line 184 drops below a predesigned value, this is indicative of the temperature sensor 12 experiencing an open fault.

Figure 3:
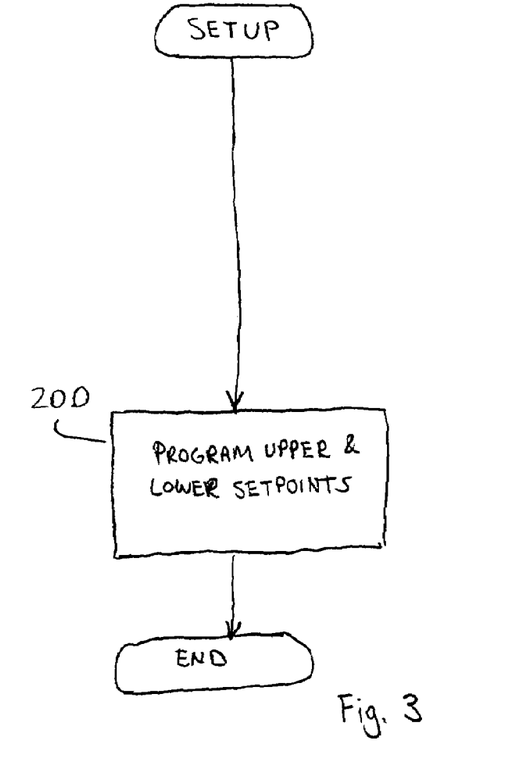
FIG. 3 is a flowchart suitable for programming calibration data and setpoints within the solid-state thermostat in accordance with the present invention.

Referring now to FIG. 3, the process for programming calibration and setpoint data in the thermostat 10 is illustrated. In order to program the thermostat 10, a personal computer or other programming device is coupled to the thermostat 10 via the programming interface input 20. In step 200, a fixed resistor associated with a lower band setpoint is connected to the thermostat 10 via terminals 50 and 52. The temperature measurement from the fixed resistor is input to the microprocessor 30 via the output of the amplifier 54. At the same time, the thermostat 10 is provided with input data indicating that the temperature measurement represents the lower band setpoint value. An upper band setpoint value is similarly programmed using another fixed resistor associated with the upper band setpoint.

As will be appreciated, there are various ways in which to calibrate and establish setpoints in the thermostat 10. Only one example has been described herein, and the scope of the present invention is not limited to such example.

Figure 4:
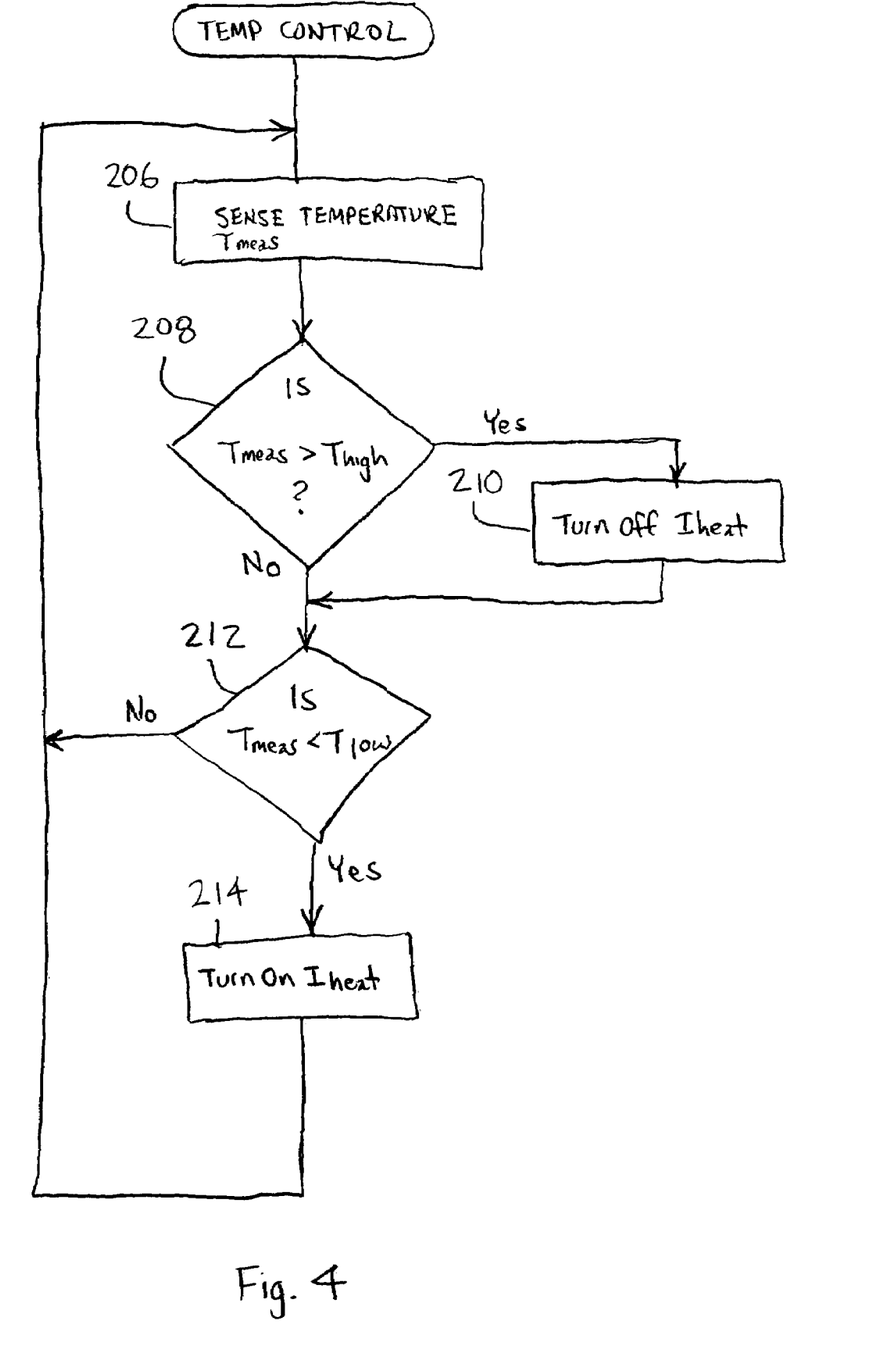
FIG. 4 is a flowchart suitable for programming the solid-state thermostat to control temperature in accordance with the present invention.

FIG. 4 illustrates the basic temperature control operation carried out by the thermostat 10. Beginning in step 206, the microprocessor 30 samples the output of the amplifier 54 in order to obtain a temperature measurement $T_{meas}$ from the temperature sensor 12. In step 208, the microprocessor 30 determines whether the temperature measurement is greater than the upper band setpoint temperature $T_{high}$. If yes, the microprocessor 30 proceeds to step 210 in which the microprocessor 30 causes the output voltage on line 80 (FIG. 2) to go high, thereby turning on transistor Q3 and turning off transistors Q1 and Q2. As a result, the thermostat 10 turns off the heater current $I_{heat}$ through the heater element 14.

In no in step 208, or following step 210, the microprocessor 30 in step 212 determines if the temperature measurement $T_{meas}$ is less than the lower band setpoint temperature $T_{low}$. If yes in step 212, the microprocessor 30 causes the output voltage on line 80 to go low in step 214, thereby turning off transistor Q3 and turning on transistors Q1 and Q2. As a result, the heater current $I_{heat}$ flows through the heater element 14 and the microprocessor 30 returns to step 206. If the temperature measurement $T_{meas}$ is not less than the lower band setpoint temperature as determined in step 212, the microprocessor 30 returns directly to step 206 and the process is repeated.

As will be appreciated, the thermostat 10 in the exemplary embodiment will not turn on the heater current $I_{heat}$ until the temperature drops below the lower band setpoint temperature, and will not turn off the heater current $I_{heat}$ until the temperature rises above the upper band setpoint temperature. Consequently, the thermostat 10 has built in hysteresis. In another embodiment, the thermostat 10 may turn the heater current on or off based simply on whether the measured temperature is above or below a single setpoint temperature as will be appreciated.

Figure 5:
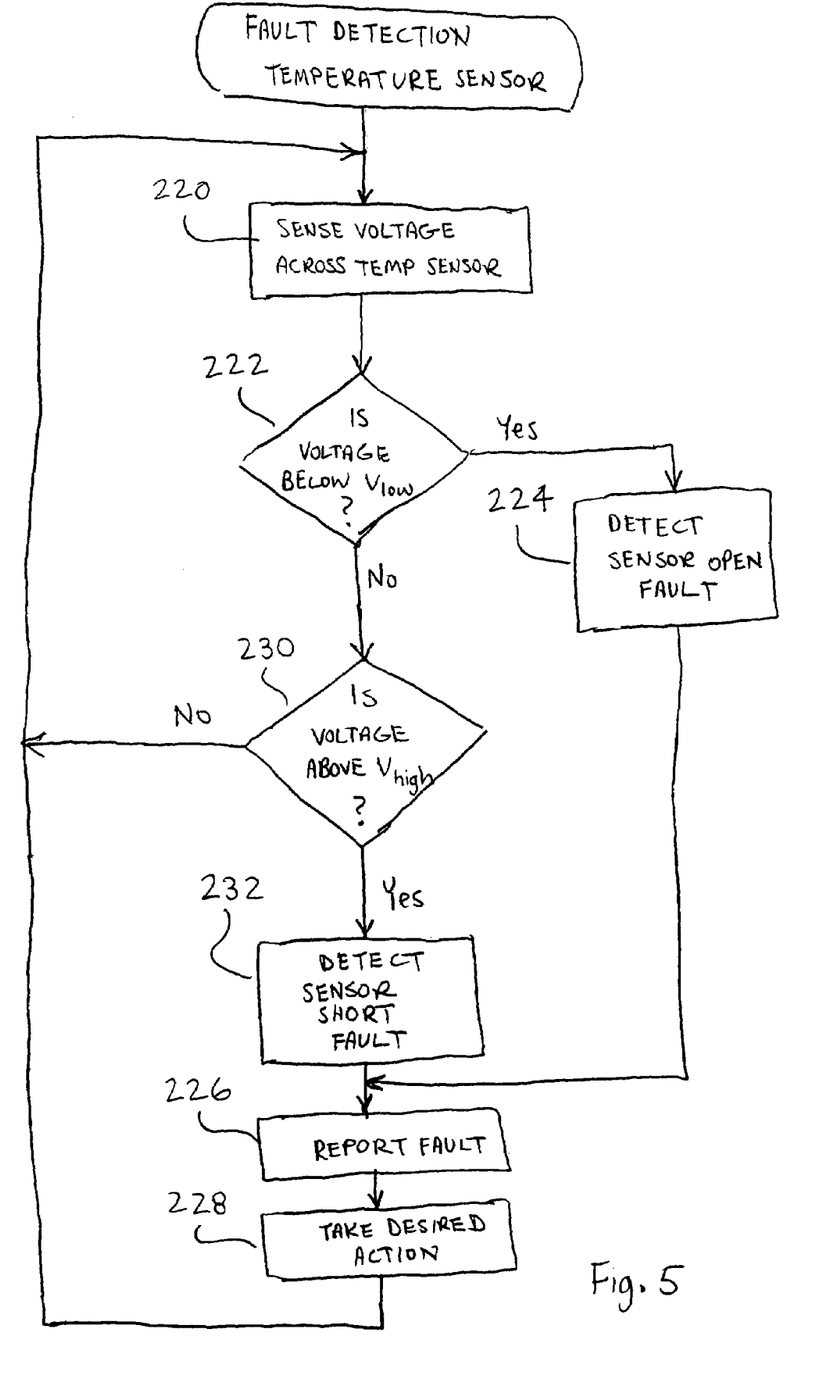
FIG. 5 is a flowchart suitable for programming the solid-state thermostat to detect a fault in the temperature sensor in accordance with the present invention.

FIG. 5 illustrates the operation of the microprocessor 30 insofar as detecting a fault in the temperature sensor 12. Beginning in step 220, the microprocessor 30 detects the voltage across the temperature sensor 12 based on the voltage input on line 184. Next, in step 222 the microprocessor 30 detemines if the voltage on line 184 is below a predefined open fault threshold $V_{low}$. Such threshold may be previously programmed into the microprocessor 30 via the input interface 20 as will be appreciated. If yes in step 222, the microprocessor 30 determines that an open fault exists with respect to the temperature sensor 12 as represented in step 224. The microprocessor 30 proceeds to step 226 in which the microprocessor 30 reports the fault to an external device if desired via the opto-coupler 46. In addition, or in the alternative, the microprocessor 30 may store a record of the fault in the memory 34. In step 228, the microprocessor 30 takes appropriate action as determined by the particular application. For example, the microprocessor 30 may be programmed to simply allow the heater current $I_{heat}$ to continue to flow unregulated based on the output on line 80. Alternatively, the microprocessor 30 may be programmed to shut off the heater current $I_{heat}$ upon detection of the fault. Following step 228, the microprocessor 30 returns to step 220 and the process is repeated.

If in step 222 the microprocessor 30 determines that the voltage sensed in step 220 is not below $V_{low}$, the microprocessor 30 proceeds to step 230 in which it determines if the voltage is above a predefined short fault threshold $V_{high}$. Again such threshold may be previously programmed into the microprocessor 30 via the input interface 20 as will be appreciated. If no in step 230, the microprocessor 30 simply returns to step 220. If yes, the microprocessor 30 determines that a short fault exists with respect to the temperature sensor 12 as represented in step 232. The microprocessor 30 then proceeds to step 226 in which it reports the fault via the opto-coupler 46, stores the fault report in memory, etc., and takes any predefined action as represented in step 228.

Figure 6:
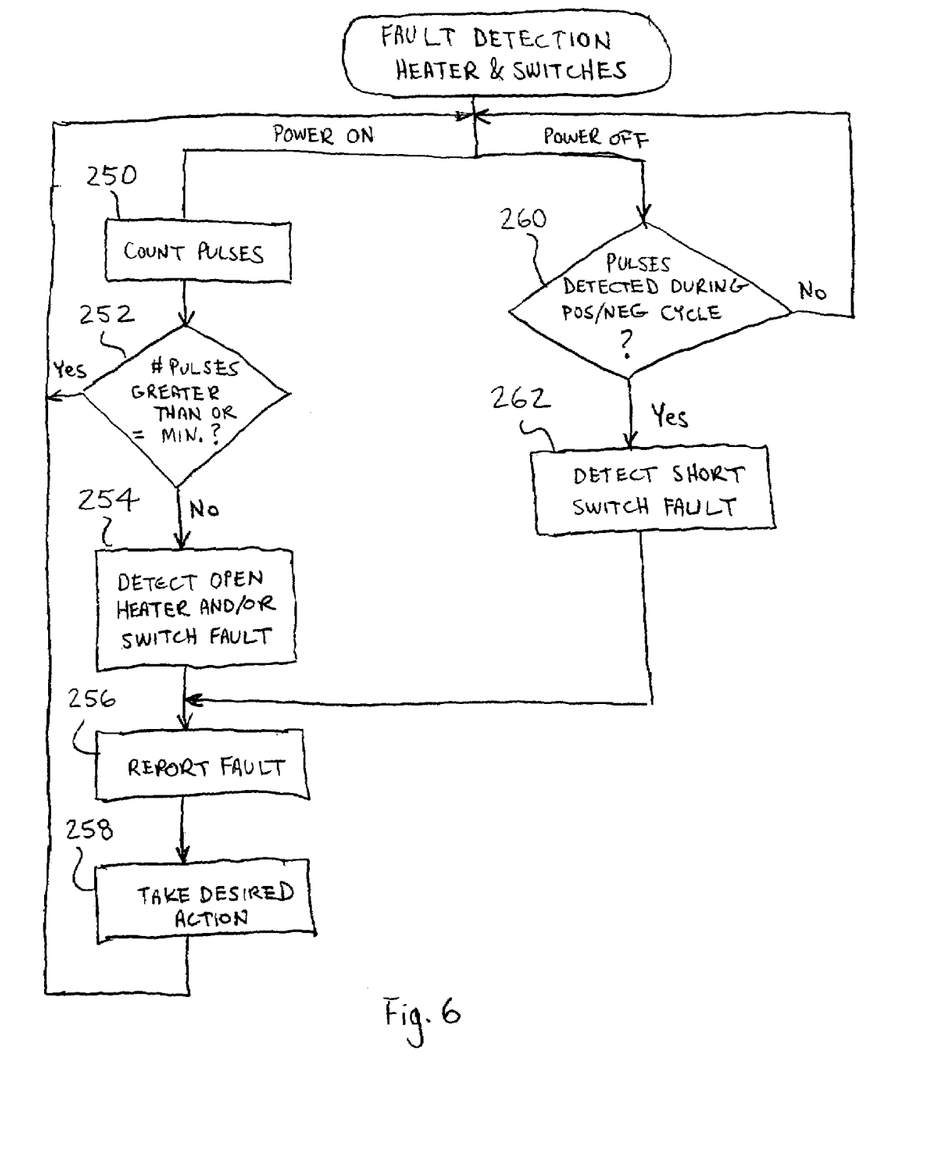
FIG. 6 is a flowchart suitable for programming the solid-state thermostat to detect a fault in the heater or switches in accordance with the present invention.

FIG. 6 represents the process carried out by the microprocessor 30 for detecting a fault in the heater element 14 or power switching transistors Q1 and Q2. In the event the microprocessor 30 is in a condition where power to the heater element 14 is on (i.e., during heating when transistors Q1 and Q2 are on by virtue of line 80 having a low voltage), the microprocessor 30 proceeds to step 250. In step 250, the microprocessor 30 counts the pulses received from the comparators 38 and 40 via lines 180 and 182, respectively. Provided the transistors Q1 and Q2 and the heater element 14 are operating properly, the positive and negative cycles of the AC current flowing through the transistors and heater element 14 will cause the comparators 38 and 40 to output a pulse with each respective cycle. In the case of DC operation, a single positive going pulse will be output.

The microprocessor 30 is programmed to count the pulses received from each of the comparators 38 and 40. In the exemplary embodiment, the microprocessor 30 counts the pulses during a predefined time window. Based on the knowledge of the lowest frequency at which the thermostat will receive power from the AC supply 16, it is known what the minimum number of received pulses should be if the transistors and heater element are working properly. Such minimum is programmed into the microprocessor 30. If the number of pulses counted by the microprocessor 30 is at least the predefined minimum as determined in step 252, the transistors Q1 and Q2 and the heater element 14 are determined to be operating properly and the microprocessor 30 returns to step 250.

On the other hand, if in step 252 the microprocessor 30 does not detect the minimum number of pulses from one or both of the comparators 38 and 40, an open heater and/or switch fault is detected as represented in step 254. Specifically, if an open fault occurs in either of the transistors Q1 or Q2, or in the heater element 14, the heater current $I_{heat}$ will not flow. Therefore, neither comparator 38 or 40 will output pulses to the microprocessor 30. The microprocessor 30 then proceeds to steps 256 and 258 for reporting the fault and taking appropriate action similar to steps 226 and 228 discussed above in relation to FIG. 5. The microprocessor 30 then returns to step 250.

It will be appreciated that the counting of the pulses in step 250 may occur during a single time window, or be represented by an average over multiple time windows as a form of filtering of the count data.

It will be further appreciated that in the event of DC power operation, the microprocessor 30 may be programmed simply to look for specific DC logic levels on lines 180 and 182. This can be done in lieu of counting a single pulse. In the absence of the appropriate DC logic levels, a fault may be detected.

In the event the microprocessor 30 is in a condition where the power to the heater element 14 is off (i.e., during non-heating when transistors Q1 and Q2 are off by virtue of line 80 having a high voltage), the microprocessor 30 proceeds to step 260 as shown in FIG. 6. Specifically, the microprocessor 30 determines in step 260 whether any pulses are detected on lines 180 or 182. If no pulses are detected, indicating that current is not flowing through either of the transistors Q1 and Q2 and the thermostat 10 is functioning properly, the microprocessor 30 simply loops around step 260. If pulses are detected on either of lines 180 and 182, this indicates that a short fault exists in the corresponding transistor Q1 or Q2 as represented in step 262. In other words, current is flowing through the transistor despite the transistor being off. The microprocessor 30 then proceeds to steps 256 and 258 to report the faults and take appropriate action, etc.

Figure 7:
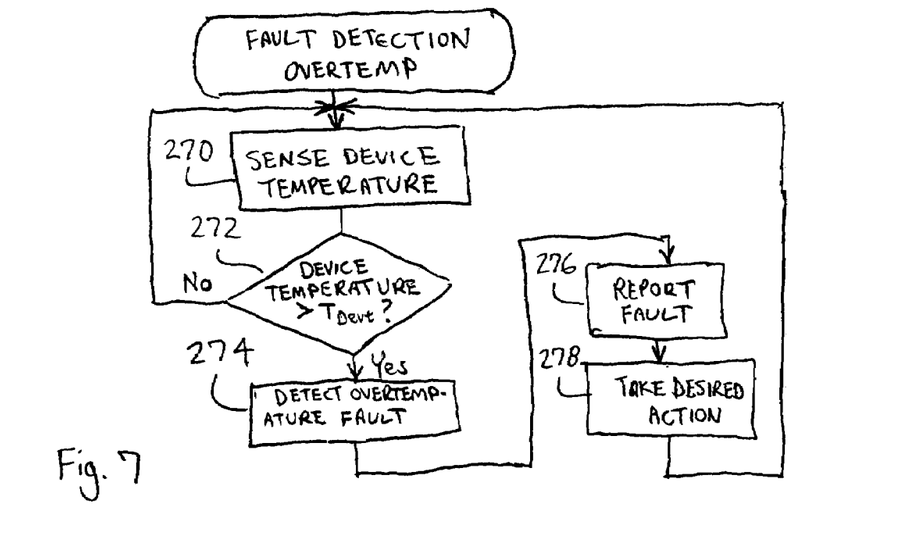
FIG. 7 is a flowchart suitable for programming the solid-state thermostat to detect an overtemperature fault in accordance with the present invention.

FIG. 7 illustrates the process for detecting an overtemperature fault of the thermostat 10. Specifically, in step 270 the microprocessor 30 measures the temperature of the thermostat 10 based on the reading of the built-in temperature sensor 44. The microprocessor 30 then determines in step 272 whether the measured temperature exceeds a predetermined threshold temperature $T_{devt}$. Such threshold temperature may be programmed into the microprocessor 30 as will be appreciated. If no in step 272, the microprocessor 30 returns to step 270. If yes, the microprocessor 30 proceeds to step 274 in which it determines that an overtemperature fault has occurred. In such case, the microprocessor 30 proceeds to steps 276 and 278 where the microprocessor 30 reports the fault and takes the appropriate action similar to steps 226 and 228 in FIG. 5.

Figure 8:
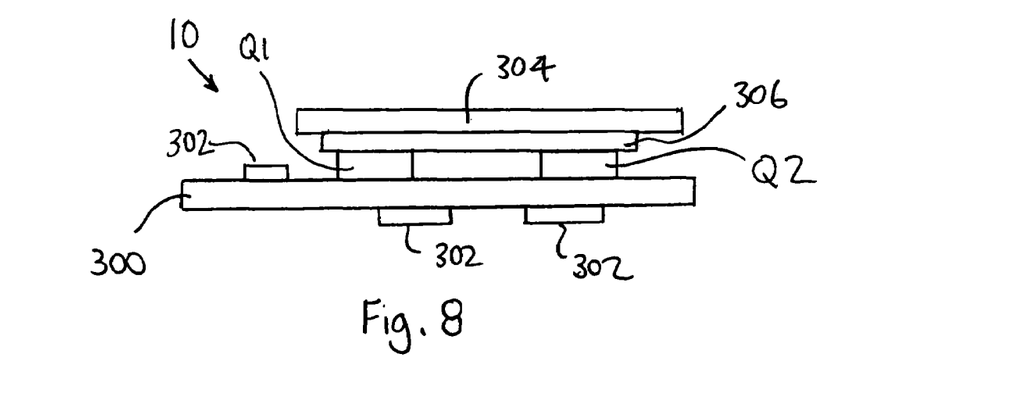
FIG. 8 is a side view of the solid-state thermostat in accordance with an embodiment of the invention.

Referring briefly to FIG. 8, a side view of an exemplary construction of the thermostat 10 is shown. The thermostat 10 includes a double-sided circuit board 300 on which the various elements shown in FIG. 2 are mounted. In the exemplary embodiment, integrated circuit packages including the amplifiers, comparators, microprocessor, etc., are generically labeled as 302. The power switching transistors Q1 and Q2, on the other hand, are respectively labeled as such.

In the case of switching transistors Q1 and Q2, the transistors will heat up during operation. Consequently, it is desirable to provide a heat sink attached to the transistors. Conventionally, transistors are bolted to a heat sink. In accordance with another aspect of the invention, the transistors Q1 and Q2 are mounted to a heat sink 304 by virtue of a double-sided pressure-sensitive adhesive tape 306. For example, Kapton™ tape provides good thermal transfer characteristics and dielectric properties for adhering the transistors Q1 and Q2 to the heat sink 304 while providing satisfactory heat dissipation. The use of tape avoids the need for silicon grease or pads conventionally utilized to increase the thermal conductivity between the transistors and the heat sink. The entire arrangement may then be potted or encapsulated.

Accordingly, it will be appreciated that the thermostat in accordance with the present invention replaces conventional mechanical and electronic thermostats that are used to control temperatures and regulate power. The thermostat may be used to control temperature and regulate power in heated hoses, floor panels, drain masts and water heaters in an aircraft, as well as in a variety of different temperature control systems not necessarily limited to aircraft applications. The thermostat is capable of operating using 115 volt AC single phase power from the power supply, and such AC power may be over a wide range of frequencies (e.g., from 0 Hertz (Hz) to 1000 Hz). This is particularly beneficial in aircraft applications where the supply voltage frequencies can vary significantly and include frequencies in which conventional thermostats are non-operational.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A low noise solid state thermostat, comprising:
   a thermostat input operatively configured to be coupled to a temperature sensor;
   a comparator for comparing an output of the temperature sensor to a predefined setpoint temperature;
   solid-state switching circuitry operatively coupled to the comparator for selectively switching current to a thermostat output based on the comparison by the comparator; and
   a microprocessor configured to monitor operation of the thermostat and to detect a fault in the operation,
   wherein the microprocessor detects at least one of an open fault at the output of the thermostat, a short fault in the solid-state switching circuitry, an open fault in the solid-state switching circuitry, or an overtemperature fault.

2. The thermostat of claim 1, wherein the microprocessor detects a plurality of types of faults in the operation.

3. The thermostat of claim 1, wherein the microprocessor detects an open fault at the output of the thermostat.

4. The thermostat of claim 1, wherein the microprocessor detects a short fault in the solid-state switching circuitry.

5. The thermostat of claim 1, wherein the microprocessor detects an open fault in the solid-state switching circuitry.

6. The thermostat of claim 1, wherein the microprocessor detects an overtemperature fault.

7. The thermostat of claim 1, further comprising a reporting output for reporting detection of a fault to an external device.

8. The thermostat of claim 7, wherein the reporting output provides information indicative of the particular fault.

9. The thermostat of claim 1, wherein the microprocessor detects at least two of the different types of faults.

10. The thermostat of claim 1, wherein the microprocessor detects at least three of the different types of faults.

11. The thermostat of claim 1, wherein the microprocessor detects all of the different types of faults.

12. The thermostat of claim 1, wherein upon detection of a fault, the microprocessor is configured to allow current to continue to flow to the thermostat output.

13. The thermostat of claim 1, wherein upon detection of a fault, the microprocessor is configured to shut off current flow to the thermostat output.

14. A low noise solid state thermostat, comprising;
    a thermostat input operatively configured to be coupled to a temperature sensor;
    a comparator for comparing an output of the temperature sensor to a predefined setpoint temperature;
    solid-state switching circuitry operatively coupled to the comparator for selectively switching current to a thermostat output based on the comparison by the comparator; and
    a microprocessor configured to monitor operation of the thermostat and to detect a fault in the operation,
    wherein the microprocessor detects at least one of a short fault in the temperature sensor or an open fault in the temperature sensor.

15. The thermostat of claim 14, wherein the microprocessor detects an open fault in the temperature sensor.

16. The thermostat of claim 14, wherein the microprocessor detects a short fault in the temperature sensor.

17. A low noise solid state thermostat, comprising:
    a thermostat input operatively configured to be coupled to a temperature sensor;
    a comparator for comparing an output of the temperature sensor to a predefined setpoint temperature;
    solid-state switching circuitry operatively coupled to the comparator for selectively switching current to a thermostat output based on the comparison by the comparator; and
    a microprocessor configured to monitor operation of the thermostat and to detect a fault in the operation
    wherein the microprocessor detects a fault in the temperature sensor based on a voltage across the temperature sensor.

18. A low noise solid state thermostat, comprising:
    a thermostat input operatively configured to be coupled to a temperature sensor;
    a comparator for comparing an output of temperature sensor to a predefined setpoint temperature;
    solid-state switching circuitry operatively coupled to the comparator for selectively switching current to a thermostat output based on the comparison by the comparator; and
    a microprocessor configured to monitor operation of the thermostat and to detect a fault in the operation,
    wherein the microprocessor detects an overtemperature fault based on another temperature sensor internal to the microprocessor.

19. A low noise solid state thermostat, comprising:
    a thermostat input operatively configured to be coupled to a temperature sensor;

a comparator for comparing an output of the temperature sensor to a predefined setpoint temperature;

solid-state switching circuitry operatively coupled to the comparator for selectively switching current to a thermostat output based on the comparison by the comparator; and a microprocessor configured to monitor operation of the thermostat and to detect a fault in the operation, wherein the microprocessor detects a fault in the solid-state switching circuitry by counting pulses associated with operation of the solid-state switching circuitry.

20. The thermostat of claim 19, wherein the solid-state switching circuitry comprises first and second power transistors connected in series with the heating element.

21. The thermostat of claim 20, wherein the pulses are generated by current sense resistors connected in the series.

* * * * *